(12) United States Patent
Nishimoto

(10) Patent No.: US 8,914,561 B2
(45) Date of Patent: Dec. 16, 2014

(54) SEMICONDUCTOR INTEGRATED CIRCUIT

(71) Applicant: Casio Computer Co., Ltd., Shibuya-ku, Tokyo (JP)

(72) Inventor: Masateru Nishimoto, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/919,911

(22) Filed: Jun. 17, 2013

(65) Prior Publication Data

US 2014/0013133 A1   Jan. 9, 2014

(30) Foreign Application Priority Data

Jul. 5, 2012   (JP) .................................. 2012-151068

(51) Int. Cl.
*G06F 13/00* (2006.01)
*G06F 1/32* (2006.01)
*G06F 3/00* (2006.01)

(52) U.S. Cl.
CPC ............... *G06F 1/32* (2013.01); *G06F 1/3243* (2013.01)
USPC ............. 710/38; 710/2; 710/5; 710/8; 710/15

(58) Field of Classification Search
None
See application file for complete search history.

(56) References Cited

U.S. PATENT DOCUMENTS

2012/0036295 A1\* 2/2012 Kozato et al. .................. 710/105
2013/0225067 A1\* 8/2013 Card et al. ......................... 455/7

FOREIGN PATENT DOCUMENTS

| JP | 03270377 A | 12/1991 |
| JP | 07-030374 A | 1/1995 |
| JP | 09018746 A | 1/1997 |
| JP | 10178560 A | 6/1998 |
| JP | 2000312327 A | 11/2000 |
| JP | 2004-153303 A | 5/2004 |
| JP | 2008263646 A | 10/2008 |
| JP | 2010049350 A | 3/2010 |

OTHER PUBLICATIONS

Japanese Office Action dated Jun. 17, 2014 in counterpart Japanese Application No. 2012-151068.

\* cited by examiner

*Primary Examiner* — Scott Sun
(74) *Attorney, Agent, or Firm* — Holtz, Holtz, Goodman & Chick PC

(57) ABSTRACT

A power consumption of a semiconductor integrated circuit is reduced. A semiconductor integrated circuit comprises a first path P1 for performing data processing in a data processing circuit and a second path P2 for bypassing the data processing circuit or for performing data processing in a simplified circuit. The semiconductor integrated circuit exclusively selects the first path and the second path depending on an operational mode, and stops a data input into a path that is not selected, resulting in a reduction of the power consumption.

4 Claims, 5 Drawing Sheets

SEMICONDUCTOR INTEGRATED CIRCUIT

CROSS-REFERENCE TO RELATED APPLICATION

This application claims the benefit of Japanese Patent Application No. 2012-151068, filed on Jul. 5, 2012, the entire disclosure of which is incorporated by reference herein.

FIELD

This application relates to a semiconductor integrated circuit technique where a plurality of functional blocks performing predetermined processes are integrated in one semiconductor.

BACKGROUND

In general, a LSI that is a semiconductor integrated circuit handling image data in a digital camera and the like is mounted with an image processing circuit that is a data processing circuit performing image processing of input image data. As described in Unexamined Japanese Patent Application Kokai Publication No. H7-30374, for example, a most part of this image processing circuit comprises an arithmetic unit such as an adder, a multiplier, a divider, and the like.

However, this image processing is not always performed. In some cases, an image of input image data is not processed and then output as-is.

For example, when an image processing circuit is a moving image filter circuit, it is required not to use a moving image filter for still image shooting. In this case, a filter coefficient of a targeted pixel is set to be 1 and filter coefficients other than the targeted pixel are set to be 0, resulting in that a filter function becomes OFF to output input data as-is.

FIG. 1 is a block diagram illustrating one example of a conventional filter circuit.

In FIG. 1, the symbol 10 represents a horizontal filter in a semiconductor integrated circuit.

Herein, the horizontal filter 10 comprises registers 101 to 105, multipliers 111 to 115, and adders 121 to 124.

Now, a filter function of this horizontal filter 10 is allowed to be OFF and then input pixel data T0 is output as-is. Data of targeted pixel is designated as T8; and then a filter coefficient T3 of the multiplier 113 for multiplying the data of targeted pixel T8 by the coefficient is set to be 1, and filter coefficients T1, T2, T4, and T5 of those other than the multiplier 113 are set to be 0. This coefficient setting causes output data T13 of the multiplier 113 to have the same value as the data of targeted pixel T8. In addition, output data T11, T12, T14, and T15 of the multipliers 111, 112, 114, and 115 have a value of 0, respectively. Therefore, a value of output data, a filter output, T19 of the adder 124 at a final stage becomes the same value as the data of targeted pixel T8. In other words, the filter function of the horizontal filter 10 becomes OFF and then input data is output as-is without undergoing filtering.

However, in the horizontal filter 10, even when input data processing is unnecessary, the multipliers and the adders configuring the horizontal filer 10 still operate, resulting in a large amount of power consumption.

In this manner, a semiconductor integrated circuit provided with a conventional data processing circuit has produced a problem that even when data processing using a data processing circuit is unnecessary, arithmetic units configuring the data processing circuit still operate, resulting in power consumption.

SUMMARY

In view of solving the conventional problem, an object of this application is to provide a technique for reducing power consumption of a semiconductor integrated circuit.

In order to solve the problem, a semiconductor integrated circuit comprising a data processing circuit and by including operational modes that include (i) performing data processing in the data processing circuit, and (ii) bypassing the data processing circuit or performing data processing in a simplified circuit, the semiconductor integrated circuit comprising:

a first path performing data processing in the data processing circuit; and a second path bypassing the data processing circuit or performing data processing in the simplified circuit, wherein the first path or the second path are exclusively selected depending on an operational mode to stop a data input into a path that is not selected.

Further, the first path or the second path are exclusively selected depending on the operational mode to stop a clock input into the circuit of the path that is not selected.

Further, the semiconductor integrated circuit comprising:

a filter circuit including a plurality of registers and a plurality of arithmetic units; and a delay circuit outputting input data as-is at the same timing as an output timing of the filter circuit, and including operational modes that include filtering data in the filter circuit, and bypassing the filter circuit to output data as-is in the delay circuit, wherein the semiconductor integrated circuit comprises:

a first path filtering data in the filter circuit; and a second path bypassing the filter circuit to output data as-is in the delay circuit, wherein depending on the operational modes, in the case of a mode filtering data in the filter circuit, the first path is selected and at the same time, a data input into the second path is stopped; and in the case of a mode bypassing the filter circuit, the second path is selected and at the same time, a data input into the first path is stopped.

Still further, the semiconductor integrated circuit comprising:

a divider;

a bit shift circuit; and a divisor discriminator discriminating whether a divisor is executable by bit shifting, wherein the semiconductor integrated circuit comprises:

a first path performing division in the divider; and a second path performing division in the bit shift circuit, wherein when the divisor is not executable by bit shifting in the divisor discriminator, the first path is selected and a data input into the second path is stopped; and when the divisor is executable by bit shifting, the second path is selected and a data input into the first path is stopped.

The semiconductor integrated circuit of this application is capable of reducing power consumption.

BRIEF DESCRIPTION OF THE DRAWINGS

A more complete understanding of this application can be obtained when the following detailed description is considered in conjunction with the following drawings, in which.

DETAILED DESCRIPTION

Embodiment 1

An embodiment in the case of applying this application to a filter circuit of a digital camera will now be described with reference to the drawings.

Figure 1:
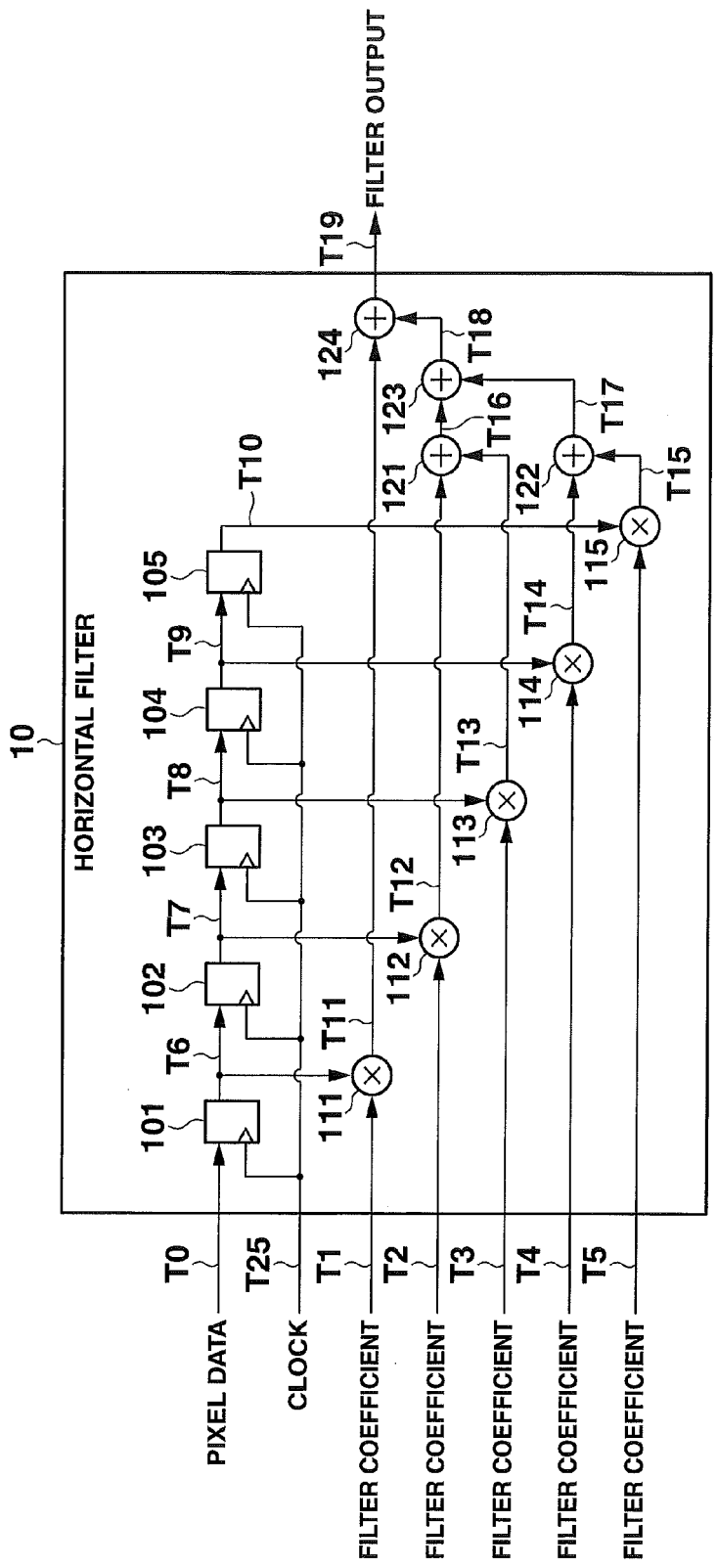
FIG. 1 is a block diagram illustrating one example of a conventional filter circuit.
Figure 2:
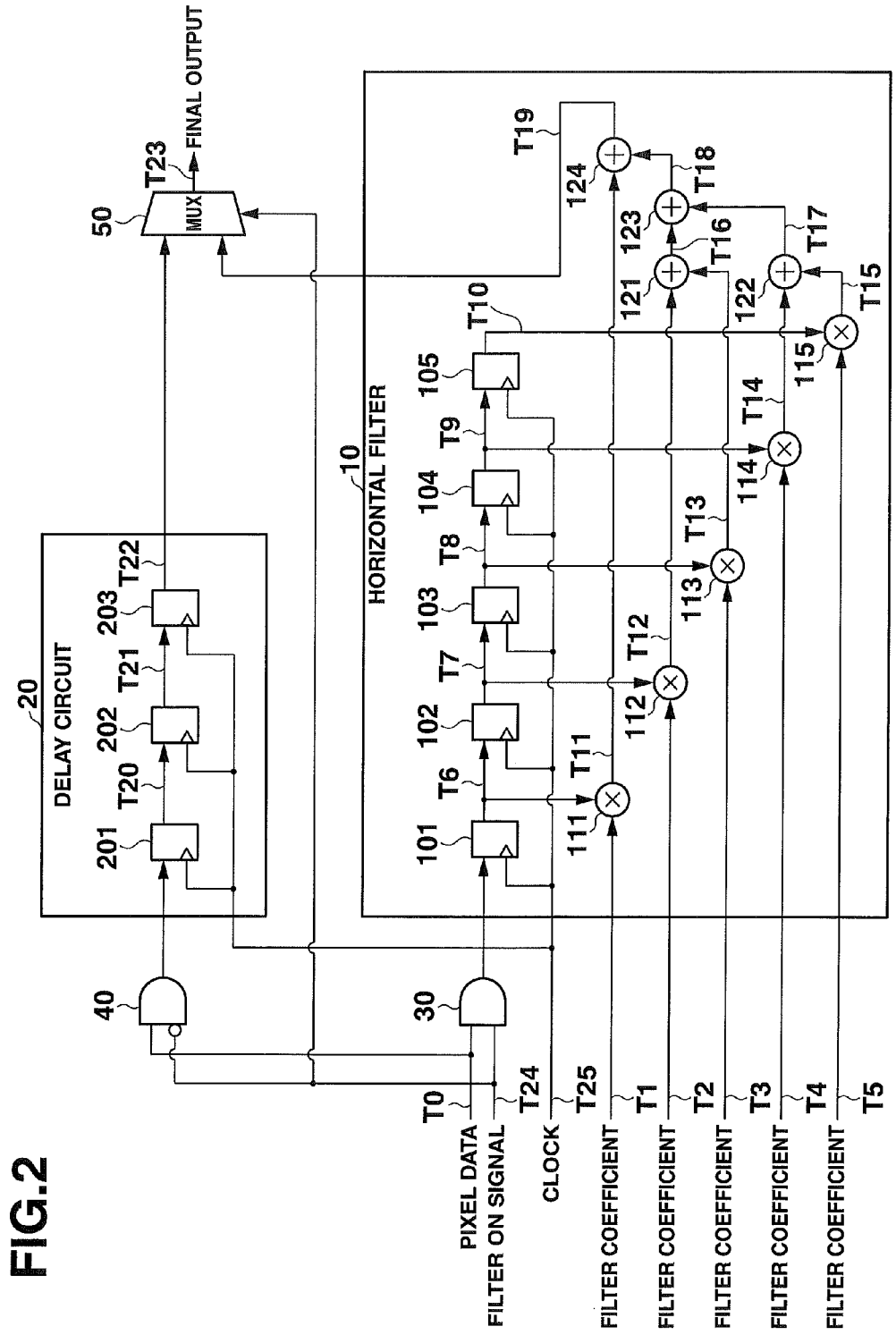
FIG. 2 is a block diagram of a filter circuit according to this application.

FIG. 2 is a block diagram of a filter circuit of a digital camera according to an embodiment of this application.

In FIG. 2, the symbol 10 represents a horizontal filter that horizontally filters input pixel data T0. The symbol 20 represents a delay circuit that outputs input pixel data T0 as-is at the same timing as an output timing of the horizontal filter 10. The symbol 30 represents a mask circuit that masks pixel data T0 input into the horizontal filter circuit to 0 in the case of not using the horizontal filter 10. The symbol 40 represents a mask circuit that masks pixel data T0 input into the delay circuit 20 to 0 in the case of using the horizontal filter 10. Further, the symbol 50 represents a selection circuit that selects whether a final output T23 of this filter circuit is an output T19 of the horizontal filter 10 or an output T22 of the delay circuit 20.

Herein, the horizontal filter 10 comprises registers 101 to 105, multipliers 111 to 115, and adders 121 to 124.

The registers 101 to 105 delay pixel data T0 input by raster scanning and horizontally store a plurality of pixel data.

The multipliers 111 to 115 multiply filter coefficients T1 to T5, each determined by a position of a pixel, by pixel data T6 to T10.

The adders 121 to 124 add all multiplied results T11 to T15.

Further, the delay circuit 20 comprises registers 201 to 203 for outputting input pixel data T0 as-is at the same timing as an output timing of the filter circuit 10.

An example of this application will now specifically be described with reference to FIG. 2.

First, operations in the case of applying filtering in this filter circuit will be described below.

With respect to an input pixel data T0, data of one pixel per cycle is input by raster scanning Since a filter ON signal T24 is 1 (filter function: ON), the input pixel data T0 is not masked in a mask circuit 30 then input into the horizontal filter 10. In the horizontal filter 10, the registers 101 to 105 accumulate data of horizontal five pixels. The accumulated data T6 to T10 of the horizontal five pixels are multiplied by filter coefficients T1 to T5 determined by a position of an accumulated pixel, using the multipliers 111 to 115. All of these multiplied results T11 to T15 are added using the adders 121 to 124 at the following stage and then output from the horizontal filter 10 as a filtered data T19.

This path via the mask circuit 30 and the horizontal filter 10 is designated as a first path (P1, not illustrated).

On the other hand, in the delay circuit 20, the pixel data T0 is masked in the mask circuit 40 and then output data T22 has a value of 0, since the filter ON signal T24 is 1 (filter function: ON).

This path via the mask circuit 40 and the delay circuit 20 is designated as a second path (P2, not illustrated).

Then, since the filter ON signal T24 is 1 (filter function: ON), the selection circuit 50 selects an output T19 of the horizontal filter 10. Therefore, the filtered pixel data is output as a final output T23 of this filter circuit.

Next, operations in the case of applying no filtering in this filter circuit where input data is output as-is without undergoing filtering will be described below.

In the same manner as in the case of the filter function ON, with respect to the input pixel data T0, data of one pixel per cycle is input by raster scanning. The input pixel data T0 is not masked in a mask circuit 40 of the second path P2 and then input into the delay circuit 20, since the filter ON signal T24 is 0 (filter function: OFF). The delay circuit 20 comprises the registers 201 to 203 for outputting input pixel data T0 as-is at the same timing as an output timing of the filter circuit 10. Therefore, in this example, a value of output data T22 is output as data delayed by three clocks with unchanged contents of the input pixel data T0.

On the other hand, in the horizontal filter 10, since the filter ON signal T24 is 0 (filter function: OFF), the pixel data T0 is masked in the mask circuit 30 of the first path P1 and then the output data T19 has a value of 0. Further, input data of the horizontal filter 10 is fixed to 0. In other words, since the input data is unchanged, the multipliers 111 to 115 and the adders 121 to 124 configuring the horizontal filter 10 are not operated and therefore power consumption of the horizontal filter 10 is markedly reduced.

Then, the selection circuit 50 selects an output T22 of the delay circuit 20, since the filter ON signal T24 is 0 (filter function: OFF). Therefore, pixel data that is input pixel data as-is without undergoing filtering is output as a final output T23 of this filter circuit.

In this manner, the semiconductor integrated circuit according to this application comprises of two paths that are the first path P1 including the horizontal filter 10 for filtering and the second path P2 including the delay circuit 20 for outputting input pixel data as-is without undergoing filtering; and therefore, has the following feature: depending on whether filtering is applied, the first path P1 and the second path P2 are exclusively selected and then an input into an unoperated circuit is masked to stop an operation of the circuit.

Further, in this example, pixel data input into an unoperated circuit has been masked to 0. However, also when a clock T25 for driving the horizontal filter 10 and the delay circuit 20 is stopped, it is possible to realize an effect of reducing power consumption in the same manner.

Herein, a configuration of each circuit exemplified in the Embodiment 1 described above is just one example and not limited thereto.

Figure 3:
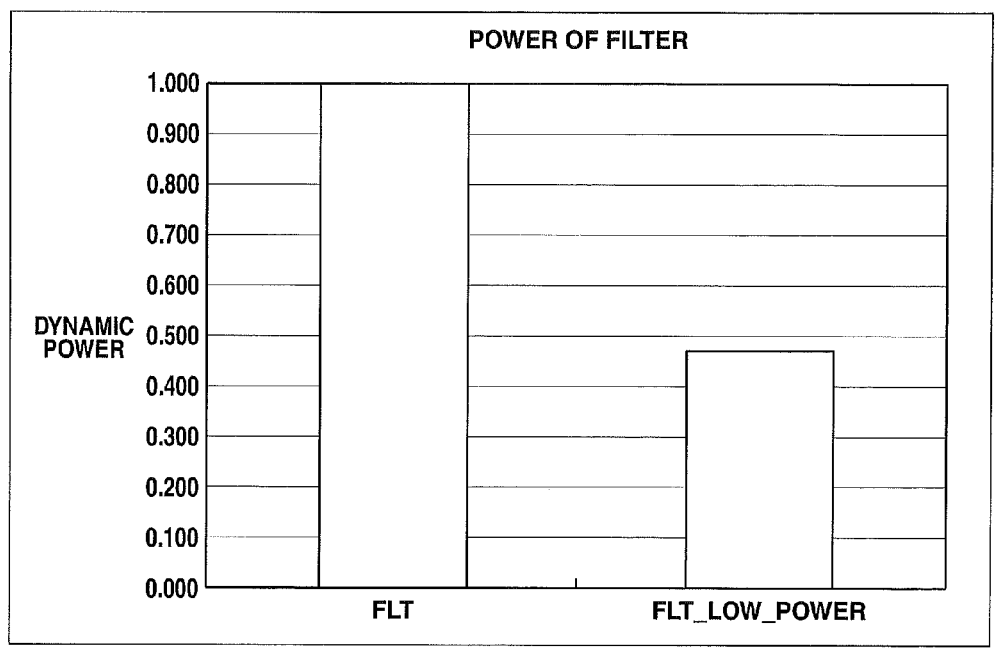
FIG. 3 is a chart illustrating an effect of reducing power consumption according to Embodiment 1.

FIG. 3 is a chart illustrating an effect of reducing power consumption according to Embodiment 1.

FLT of FIG. 3 represents power consumption where a conventional technique is employed. In other words, FLT represents power consumption at the time of outputting input data as-is where input data is output as-is without undergoing filtering by setting a filter coefficient for a targeted pixel in the filter circuit to 1 and by setting filter coefficients of pixels other than the targeted pixel to 0, in the case of applying no filtering to input pixel data. Further, FLT_Low_Power of FIG. 3 represents power consumption in Embodiment 1 of this application. In other words, FLT_Low_Power represents power consumption in the case of stopping an operation of the filter circuit to output input data as-is at an output timing matched in the delay circuit, in which no filtering is applied to input pixel data, where input data is output as-is without undergoing filtering.

As illustrated in FIG. 3, FLT_Low_Power is found to reduce power consumption to about a half of FLT.

Embodiment 2

An embodiment in the case of applying this application to a division circuit of a digital camera will now be described with reference to the drawings.

It is certainly necessary for a digital camera to have an image reduction processing. For this reduction processing, a divider is commonly used. A moving image and a still image differ from each other in a reduction rate of an image in this reduction processing. For example, in a moving image, an image size input from an image sensor device is substantially a standardized one such as VGA and the like. Therefore, reduction rate is frequently realizable by bit shifting such as divided by 2, 4, or 8. On the other hand, in a still image, an image size input from an image sensor device is not a standardized one. Therefore, a reduction rate is not substantially realizable by bit shifting.

Figure 4:
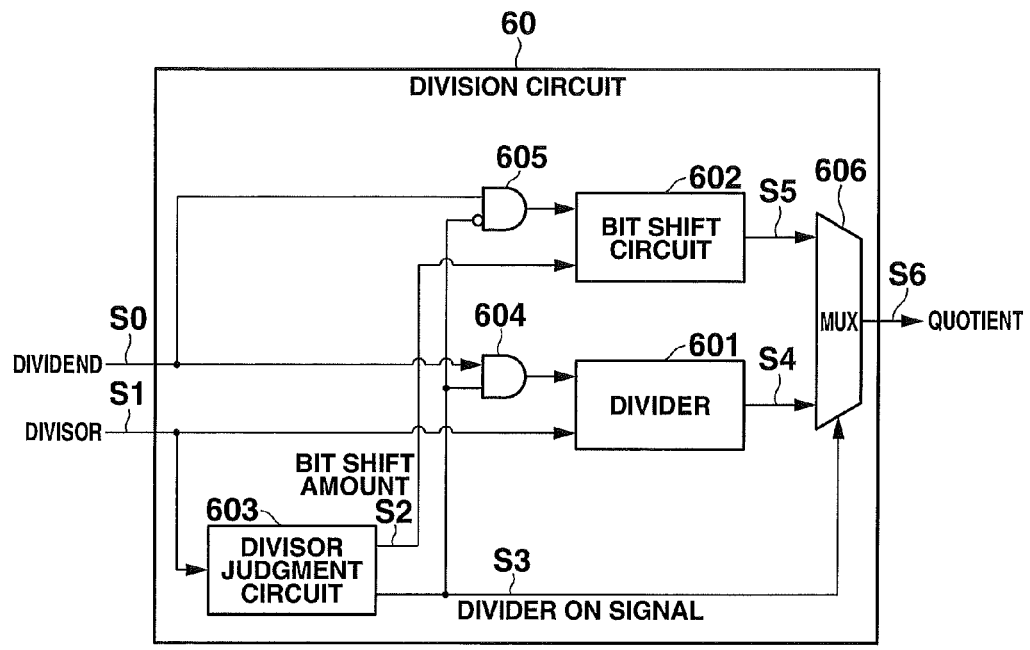
FIG. 4 is a block diagram of a division circuit according to this application.

FIG. 4 is a block diagram of a division circuit of a digital camera according to an embodiment of this application in view of such features of the digital camera.

In FIG. 4, the symbol 60 represents a division circuit in a semiconductor integrated circuit.

Herein, the division circuit 60 comprises a divider 601, a bit shift circuit 602, a divisor judgment circuit 603, a mask circuit 604, a mask circuit 605, and a selection circuit 606.

The divisor judgment circuit 603 judges whether a divisor S1 is executable by bit shifting to determine a bit shift amount S2 of the divisor S1.

The mask circuit 604 masks a dividend S0 input into the divider 601 to 0 when the divisor S1 is executable by bit shifting.

The mask circuit 605 masks a dividend S0 input into the bit shift circuit 602 to 0 when the divisor S1 is not executable by bit shifting.

The selection circuit 606 selects whether a quotient S6 output from this division circuit 60 is an output S4 of the divider 601 or an output S5 of the bit shift circuit 602.

An example of this application will now specifically be described based on FIG. 4.

First, operations in the case where a divisor of division is not executable by bit shifting in this division circuit will be described below.

A dividend S0 is input into the mask circuits 604 and 605. Further, a divisor S1 is input into the divider 601 and the divisor judgment circuit 603. The divisor judgment circuit 603 judges whether the division is executable by bit shifting, for example, judges whether the input divisor S1 of division is any of 2, 4, or 8. In this example, since the input divisor S1 is not executable by bit shifting, a divider ON signal S3 is output as 1 (bit shifting impossible). Since the divider ON signal S3 is 1 (bit shifting impossible), the dividend S0 input into the mask circuit 604 is not masked in the mask circuit 604 and then input into the divider 601. Further, the divisor S1 is input into the divider 601, therefore the divider 601 divides the dividend S0 by the divisor S1 to output a division result S4.

This path via the mask circuit 604 and the divider 601 is designated as a first path (P1', not illustrated).

On the other hand, since the divider ON signal S3 is 1 (bit shifting impossible), the dividend S0 input into the mask circuit 605 is masked in the mask circuit 605. Therefore, an output data S5 of the bit shift circuit 602 has a value of 0.

This path via the mask circuit 605 and the bit shift circuit 602 is designated as a second path (P2', not illustrated).

Then, since the divider ON signal S3 is 1 (bit shifting impossible), the selection circuit 606 selects the output S4 of the divider 601. Therefore, a quotient S6 of this division circuit becomes a division result obtained by the division circuit 601.

Next, operations in the case where a divisor of division is executable by bit shifting in this division circuit 60 will be described below.

A dividend S0 is input into the mask circuits 604 and 605. Further, a divisor S1 is input into the divider 601 and the divisor judgment circuit 603. The divisor judgment circuit 603 judges whether the division is executable by bit shifting, for example, judges whether the input divisor S1 of division is any of 2, 4, or 8. In this example, since division is executable by bit shifting, the divider ON signal S3 is output as 0 (bit shifting possible). Further, a bit shift amount S2 corresponding to the input divisor S1 is output. This bit shift amount S2 has, for example, a value of 1 when the divisor S1 is 2; a value of 2 when the divisor S1 is 4; a value of 3 when the divisor S1 is 8; and so on. Since the divider ON signal S3 is 0 (bit shifting possible), the dividend S0 input into the mask circuit 604 of the first path P1' is masked in the mask circuit 604. Therefore, output data S4 of the divider 601 has a value of 0.

On the other hand, since the divider ON signal S3 is 0 (bit shifting possible), the dividend S0 input into the mask circuit 605 of the second path P2' is not masked in the mask circuit 605. Therefore, the dividend S0 is input into the bit shift circuit 602. Further, the bit shift amount S2 is input into the bit shift circuit 602 from the divisor judgment circuit 603. Therefore, the bit shift circuit 602 bit-shifts the dividend S0 by the bit shift amount S2, and then output a division result S5.

Then, since the divider ON signal S3 is 0 (bit shift possible), the selection circuit 606 selects an output S5 of the bit shift circuit 602. Therefore, a quotient S6 of this division circuit becomes a division result obtained by the bit shift circuit 602.

In this manner, the semiconductor integrated circuit according to this application comprises two paths that are the first path P1' including the divider 601 and the second path P2' including the bit shift circuit 602. Therefore, the semiconductor integrated circuit has a feature that depending on whether a divisor of division is executable by bit shifting, the first path P1' and the second path P2' are exclusively selected and then an input into an unoperated circuit is masked to stop an operation of the circuit.

Herein, a configuration of each circuit exemplified in the Embodiment 2 described above is just one example and not limited thereto.

Figure 5:
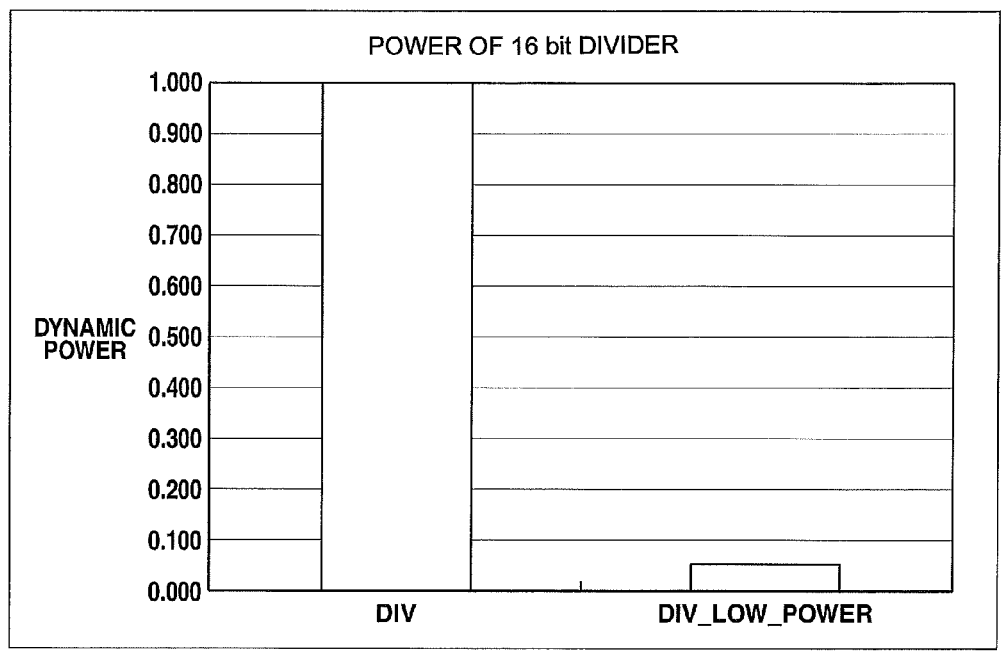
FIG. 5 is a chart illustrating an effect of reducing power consumption according to Embodiment 2.

FIG. 5 is a chart illustrating an effect of reducing power consumption according to Embodiment 2.

DIV of FIG. 5 represents power consumption where a conventional technique is employed. In other words, DIV represents power consumption at the time of performing an operation using a divider, the operation being a division executable by bit shifting since a divisor of division is any of 2, 4, or 8 when division is performed. Further, DIV_Low_Power of FIG. 5 represents power consumption in Embodiment 2 of this application. In other words, DIV_Low_Power represents power consumption in the case of performing division in the bit shift circuit 602.

As illustrated in FIG. 5, DIV_Low_Power is found to reduce power consumption to 1/10 or less of DIV.

As described in the Embodiments 1 and 2, the semiconductor integrated circuit of this application comprises the first path P1 or P1' for performing data processing in a data processing circuit; and the second path P2 or P2' for bypassing the data processing circuit or for performing data processing in a simplified circuit. In addition, depending on an operation mode, the first path P1 or P1' and the second path P2 or P2' are exclusively selected to stop a data input into a circuit of a path that is not selected.

In addition, the semiconductor integrated circuit of this application configured in this manner enables to stop an operation of a data processing circuit when the data processing circuit is bypassed or a simplified circuit is usable for performing data processing. Therefore, a decrease in a switching activity of the entire circuit and a marked reduction of power consumption are realized.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A semiconductor integrated circuit comprising a data processing circuit that inputs data, performs a predetermined operational processing to the inputted data, and outputs data that is different from the inputted data, and the semiconductor integrated circuit having operational modes including (i) performing data processing in the data processing circuit, and (ii) bypassing the data processing circuit or performing data processing in a simplified circuit which is a simpler circuit than the data processing circuit, the semiconductor integrated circuit comprising:
    a first path that inputs data into the data processing circuit, performs the predetermined operational processing to the inputted data, and outputs data that is different from the inputted data; and
    a second path that (i) bypasses the data processing circuit and outputs the same data as the inputted data, or (ii) inputs the data into the simplified circuit, which performs another predetermined operational processing to the inputted data;
    wherein the first path or the second path is exclusively selected depending on an operational mode to stop the data input into a path that is not selected.

2. The semiconductor integrated circuit according to claim 1, wherein the first path or the second path is exclusively selected depending on the operational mode to stop a clock input into the circuit of the path that is not selected.

3. The semiconductor integrated circuit according to claim 1, wherein:
    the data processing circuit comprises a filter circuit including a plurality of registers and a plurality of arithmetic units;
    the simplified circuit comprises a delay circuit outputting input data as-is at a same timing as an output timing of the filter circuit;
    the first path filters data in the filter circuit;
    the second path bypasses the filter circuit to output data as-is in the delay circuit;
    the operational modes include filtering data in the filter circuit, and bypassing the filter circuit to output data as-is in the delay circuit;
    depending on the operational modes, in the case of filtering data in the filter circuit, the first path is selected and at the same time, a data input into the second path is stopped; and
    in the case of bypassing the filter circuit, the second path is selected and at the same time, a data input into the first path is stopped.

4. The semiconductor integrated circuit according to claim 1, further comprising:
    a divisor discriminator discriminating whether a divisor is executable by bit shifting;
    wherein:
    the data processing circuit comprises a divider;
    the simplified circuit comprises a bit shift circuit;
    the first path performs division in the divider;
    the second path performs division in the bit shift circuit;
    when the divisor is not executable by bit shifting in the divisor discriminator, the first path is selected and a data input into the second path is stopped; and
    when the divisor is executable by bit shifting, the second path is selected and a data input into the first path is stopped.

* * * * *